March 15, 1966　　O. REIFENSCHWEILER　　3,240,970
METHOD AND APPARATUS FOR REPLENISHING HYDROGEN
IN A NEUTRON GENERATOR
Filed Nov. 17, 1961　　　　　　　　　　2 Sheets-Sheet 1

INVENTOR
OTTO REIFENSCHWEILER

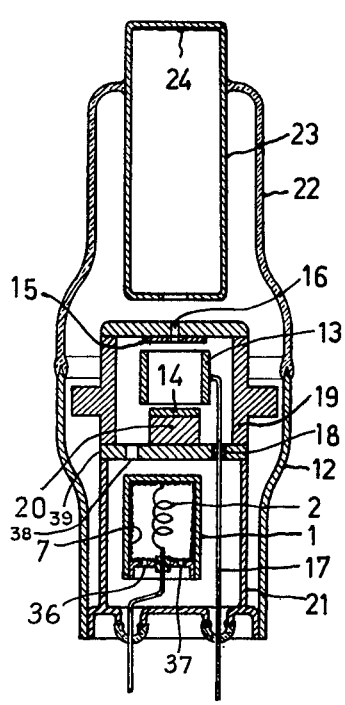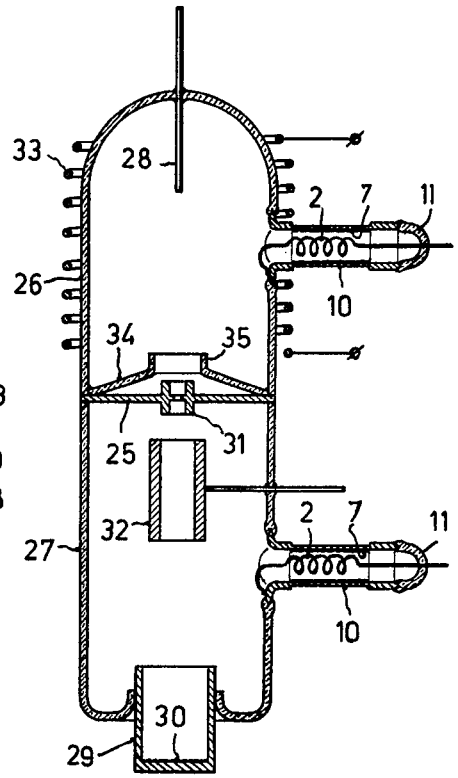

United States Patent Office 3,240,970
Patented Mar. 15, 1966

3,240,970
METHOD AND APPARATUS FOR REPLENISHING HYDROGEN IN A NEUTRON GENERATOR
Otto Reifenschweiler, Emmasingel, Eindhoven, Netherlands, assignor to North American Philips Company, Inc., New York, N.Y., a corporation of Delaware
Filed Nov. 17, 1961, Ser. No. 153,002
Claims priority, application Netherlands, Nov. 25, 1960, 258,414
7 Claims. (Cl. 313—61)

The invention relates to a method of manufacturing a hydrogen replenisher for an electric discharge tube, in which a component part of the tube is covered with a finely divided metal, for example zirconium or titanium, which is capable of reversibly absorbing hydrogen, said finely divided metal being entirely or in part saturated with hydrogen after degassing of the tube and the electrodes. The invention also relates to an electric discharge tube, more particularly a neutron generator, provided with a hydrogen replenisher made by the said method.

The term "hydrogen" as used herein includes the two isotopes deuterium and tritium, which are frequently used in neutron generators either separately or as a mixture.

A method is known in which zirconium is applied as powdered metal to the inner or outer surface of one of the cathode screens of a hydrogen thyratron or, if a lower pressure is desired, to the grid cylinder or the anode. Due to the structure of the tube, the finely powdered zirconium coating must be provided on the electrodes before they are mounted. In the process of degassing the tube, the powdered zirconium is raised to a high temperature in the gases evolved from the electrodes and consequently, is more or less contaminated. Although this need not be a disadvantage at the comparatively high pressures used in a hydrogen thyratron, the absorption speed for hydrogen is comparatively low in such layers. Consequently, if they are used, for example, in neutron generators having operating pressures of from $10^{-2}$ mm. to $10^{-4}$ mm. mercury pressure, difficulties may occur with respect to the pressure control.

In a method of manufacturing a hydrogen replenisher for an electric discharge tube, a component part of the tube is coated with a finely-divided metal, for example, zirconium or titanium, which is capable of reversibly absorbing hydrogen. After degassing of the tube and the electrodes, the so-coated part is entirely or partially saturated with hydrogen. According to the invention after the tube and the electrodes are degassed, the powdered metal is applied by vaporization in a rare gas atmosphere or by atomization in a rare gas glow discharge, during or after which process the powdered metal is saturated with hydrogen. The excess gas is removed by pumping.

Because vaporization or atomization takes place subsequent to the degassing process, the powdered metal cannot be contaminated. Moreover, by vaporizing or atomizing in a rare gas a very fine grain is obtained of the order of 100 A. units, the surface area being extremely large as compared to the weight, so that high absorption and desorption speeds are obtained. After vaporization or atomization, the rare gas is removed by pumping. Hydrogen and/or one of the two isotopes may be already present during vaporization or atomization in a rare gas, or may be admitted subsequently.

In a preferred embodiment of the invention, the hydrogen replenisher is a vaporizing helix within a metal sheath carrying the finely-divided metal layer. In this embodiment, the vaporizing helix acts as a heater for the hydrogen replenisher, which has a slight thermal capacity and hence responds quickly to fluctuations in the temperature of the heater. The metal casing for the heater may be accommodated in tubular form within the discharge tube or it may protrude in the form of a spout, the latter shape providing the advantage of increased heat dissipation and hence, of shorter adjusting period.

The replenisher is used to particular advantage in a neutron generator which is divided in two parts by a partition including a probe electrode or in general the duct (flow resistance) of the ion source, each tube half containing a hydrogen replenisher according to the invention, so that a pressure difference may be maintained.

The invention will be described with reference to the accompanying diagrammatic drawings, in which:

FIGURE 3 shows a replenisher protruding from the tube; while

FIGURES 4 and 5 show two neutron generators provided with hydrogen replenishers according to the invention.

Figure 1:
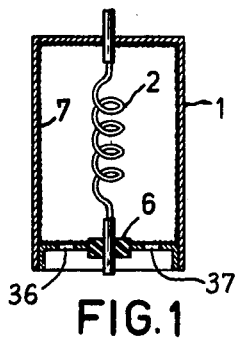
FIGURE 1 shows a hydrogen replenisher for a discharge tube.
Figure 2:
FIGURE 2 shows a detail of the vaporizing helix.

In FIG. 1, a nickel sheath 1 having a wall thickness of 0.1 mm., a diameter of 20 mm. and a length of 30 mm., contains a heater 2 comprising a tungsten core wire 3 of diameter 0.4 mm., on which are wound in intimate contact a tungsten wire 4 of diameter 0.3 mm. and a titanium wire 5 of diameter 0.3, as shown in FIG. 2.

One end of the heater 2 is secured to the upper end of the sheath, the lower end of the heater being insulated from the lower end of the sheath which is provided with apertures 36 and 37 by a ceramic insulator 6. A titanium layer deposited from vapor is designated 7.

Figure 3:
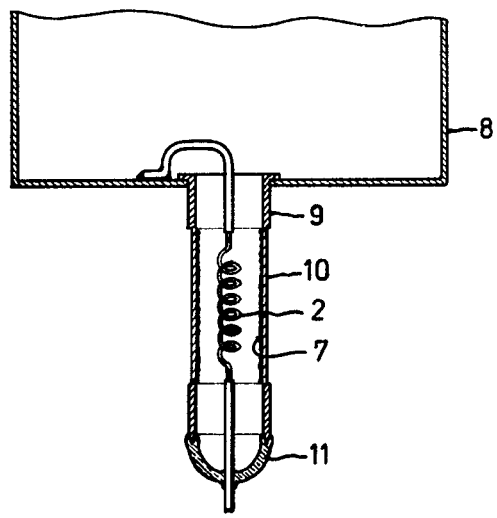

In FIGURE 3, a chrome-iron spout 9, the wall thickness of which is only 0.3 mm. along a part 10 of its length, is secured by soldering in a part 8 of the metal tube wall. On this thin-walled part, a titanium layer 7 is deposited from vapor produced by the heater 2, which extends in an insulating manner through a glass hood 11. The other end of the heater 2 is conductively connected to the tube wall 8.

When a discharge tube containing a hydrogen replenisher as illustrated in FIGURE 1 or FIGURE 3 is degassed and evacuated, argon is admitted under a pressure of 10 mms. of mercury, and subsequently the heating current through the hydrogen replenisher is gradually raised to about 30 amperes; after the evaporation of the titanium, this current falls off to about 20 amperes and subsequently is again raised to about 25 amperes by increase of the heater voltage. As a result, 25 mgs. of titanium evaporate from the wound length of about 25 mms. of the core wire 3. The argon gas is then removed by pumping and hydrogen or the desired isotopes or a mixture thereof are admitted to be immediately absorbed by the finely-divided metal layer. If desired, the isotope may already be present in the argon gas; however, in the case of an excess it is difficult to satisfy the safety requirements in the removal of the argon gas by pumping. Instead of evaporating the titanium from heater 2, this may be left cold and connected as a cathode of glow discharge towards sheath 1 so that atomization occurs.

In FIGURE 4, a hydrogen replenisher 1 having a heater 2 is disposed in a metal part 12 of a neutron generator, the ion source of which comprises a molybdenum anode 13 and a cathode constituted by two molybdenum plates 14 and 15, the latter plate having an aperture 16. The anode 13 is supported by a supply wire 17 which, by an annular insulator 18, is separated from a soft-iron sleeve 19 which together with a block of permanent magnet steel 20 constitutes the magnetic circuit for the ion source. The soft-iron sleeve 19 is supported by a nickel sleeve 21 enclosing the hydrogen replenisher 1. A glass member 22 carries a hollow electrode 23 containing a target 24. In operation, the anode of the ion source is at a potential of 2000 volts with respect to the cathode. At the electrode 23, a voltage of −125 kv. with respect to the ion source is then set up. The ion current is 0.1 milliampere at a pressure of about 3 times $10^{-4}$ mm. of mercury. The pressure is controlled by means of the temperature of the heater 2 in accordance with the strength of the ion current or with the neutron yield. The gas in the tube and the gas absorbed in the finely-divided metal layer 7 consists of an equimolecular mixture of deuterium and tritium. Hydrogen replenisher 7 is connected to the tube through apertures 36 and 37, and aperture 38 in wall 39.

In FIGURE 5, a neutron generator is divided in two halves in the form of glass bodies 26 and 37 by a fernico disc 25. The upper half contains a rod-shaped electrode 28 and the lower half contains a cylindrical electrode 29 having a target 30. An accelerating electrode 32 is arranged between an electrode 31, which is provided in the disc 25 and has a narrow aperture, and the electrode 29. The probe electrode 31 is screened by a glass coating 34 having a spout 35.

The tube is operated in the following manner. The layer 7 in the lower hydrogen replenisher initially does not contain the hydrogen isotopes deuterium and tritium, whereas the layer 7 of the upper hydrogen replenisher is saturated therewith. The lower hydrogen replenisher is maintained cold and the upper replenisher is heated, so that deuterium and tritium are evolved to a pressure of $10^{-2}$ mm. of mercury. A high-frequency current of 20 mc./s. is passed through coil 33 so that a high-frequency discharge is produced. A positive voltage of 10 kv. with respect to the electrode 31 is applied to the electrode 28, so that ions are driven towards the probe electrode 31. With negative voltages applied to electrodes 30 and 32, deuterium and tritium ions are drawn from the electrode 31, which acts as a probe, and impinge upon the target 30. The gas pressure in the chamber 27 cannot increase, because the lower hydrogen replenisher, which is maintained cold, immediately absorbs the incoming gas which is not absorbed by the target 30. With an appropriate design of the probe electrode 31, the ion current may be up to 10 milliamps, so that with an overall voltage difference between the probe 31 and the electrode 29 of 150 kv., the yield may be $10^{11}$ neutrons per second. The amount of gas absorbed in the upper hydrogen replenisher is sufficient to operate the tube for about 20 hours. Then the tube must be regenerated. This may be effected as follows. The upper hydrogen replenisher is maintained cold and the lower replenisher is heated, so that all deuterium and tritium are driven off. After a short period of time, all deuterium and tritium are again absorbed in the upper hydrogen replenisher, so that the tube may be operated again.

What is claimed is:

1. A method of manufacturing a hydrogen replenisher for an electric discharge tube comprising the steps, evacuating the tube to remove gases contained therewithin, filling the tube with a rare gas atmosphere, depositing in said atmosphere a layer of metal particles having a size of the order of 100 A. on a portion of a surface within the tube, said metal being capable of reversibly absorbing hydrogen, saturating the metal layer with hydrogen, and evacuating the tube to remove excess gas therein.

2. A method of manufacturing a hydrogen replenisher for an electric discharge tube comprising the steps, removing gases contained within the tube, filling the tube with an atmosphere of a rare gas, atomizing a metal capable of reversibly absorbing hydrogen and depositing in said atmosphere a layer of said metal in the form of particles having a size of the order of 100 A. on a surface within the tube, saturating the metal layer with hydrogen, and removing excess gas from the tube.

3. A method of manufacturing a hydrogen replenisher for an electric discharge tube comprising, removing gases contained within the tube, filling the tube with an atmosphere of a rare gas, evaporating a metal capable of reversibly absorbing hydrogen and depositing in said atmosphere a layer of said metal in the form of particles having a size of the order of 100 A. on a surface within the tube, saturating the metal layer with hydrogen, and removing excess gas from the tube.

4. A method of manufacturing a hydrogen replenisher for an electric discharge tube comprising the steps, removing gases contained within the tube, filling the tube with an atmosphere of a rare gas, depositing in said atmosphere on a surface within the tube a layer of a metal in the form of particles having a size of the order of 100 A. and selected from the group consisting of titanium and zirconium, saturating the layer of metal with hydrogen, and removing excess gas within the tube.

5. A method of manufacturing a hydrogen replenisher for an electric discharge tube comprising the steps, removing gases contained within the tube, filling the tube with an atmosphere of a rare gas, depositing in said atmosphere on a surface within the tube a layer of metal in the form of particles having a size of the order of 100 A. and capable of reversibly absorbing hydrogen, removing the rare gas atmosphere from the tube, saturating the metal layer with hydrogen, and removing excess gas within the tube.

6. A hydrogen replenisher for an electric discharge tube comprising a heating element, a sheath surrounding and spaced from said heating element and having a surface disposed to communicate with the discharge space within said tube, and a layer of a metal in the form of particles having a size of the order of 100 A. and capable of reversibly absorbing hydrogen covering at least a portion of said surface.

7. A neutron generator comprising an envelope, a partition element dividing the envelope into two discharge portions, a target electrode in one portion, a probe electrode extending through said partition for the passage of ions of hydrogen isotopes, and a separate hydrogen replenisher connected to each of the discharge portions of the envelope, each of said hydrogen replenishers comprising a heating element, a sheath surrounding and spaced from the heating element and having a surface communicating with a discharge portion of the envelope, and a layer of a metal in the form of particles having a size of the order of 100 A. and capable of reversibly absorbing hydrogen covering a portion of said surface.

References Cited by the Examiner

UNITED STATES PATENTS

| | | | |
|---|---|---|---|
| 2,766,397 | 10/1956 | Nienhuis | 313—180 |
| 2,847,331 | 8/1958 | Ashley | 117—220 |
| 2,870,364 | 1/1959 | Doolittle | 313—178 |
| 2,960,618 | 11/1960 | Waer | 313—178 |
| 2,983,820 | 5/1961 | Frentrop | 250—84.5 |

GEORGE N. WESTBY, *Primary Examiner.*

BENNETT G. MILLER, *Examiner.*